(12) United States Patent
Guo et al.

(10) Patent No.: US 11,708,943 B2
(45) Date of Patent: Jul. 25, 2023

(54) PRE-ALARMING METHOD, CONTROL METHOD AND CONTROL SYSTEM FOR HARMFUL FLOW PATTERN IN OIL AND GAS PIPELINE-RISER SYSTEM

(71) Applicant: XI'AN JIAOTONG UNIVERSITY, Shaanxi (CN)

(72) Inventors: Liejin Guo, Shaanxi (CN); Suifeng Zou, Shaanxi (CN); Quanhong Wu, Shaanxi (CN); Weizhi Liu, Shaanxi (CN); Qiang Xu, Shaanxi (CN); Longjin Guo, Shaanxi (CN); Wenbo Zhou, Shaanxi (CN); Xiangyuan Zhao, Shaanxi (CN); Tian Yao, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 330 days.

(21) Appl. No.: 16/770,062

(22) PCT Filed: Jun. 10, 2019

(86) PCT No.: PCT/CN2019/090556
§ 371 (c)(1),
(2) Date: Jul. 26, 2021

(87) PCT Pub. No.: WO2020/082749
PCT Pub. Date: Apr. 30, 2020

(65) Prior Publication Data
US 2022/0034455 A1    Feb. 3, 2022

(30) Foreign Application Priority Data
Oct. 26, 2018    (CN) ........................ 201811259487.X

(51) Int. Cl.
*F17D 3/01*    (2006.01)
*G05D 16/20*    (2006.01)
(Continued)

(52) U.S. Cl.
CPC ................ *F17D 3/01* (2013.01); *E21B 43/12* (2013.01); *E21B 44/00* (2013.01); *E21B 47/06* (2013.01); *G05D 16/204* (2013.01); *G08B 21/12* (2013.01)

(58) Field of Classification Search
CPC ........ F17D 3/01; G08B 21/12; G05D 16/204; E21B 44/00; E21B 47/06; E21B 43/12
(Continued)

(56) References Cited

U.S. PATENT DOCUMENTS 9,307,914 B2 *   4/2016   Fahey .................... G08B 21/10
2002/0092355 A1 *   7/2002   Davey ................. G01M 3/2884
73/700

(Continued)

FOREIGN PATENT DOCUMENTS

CN    1387617 A     12/2002
CN    11575500       7/2004
(Continued)

OTHER PUBLICATIONS

Zou et at., On-Line Flow Regime Identification in Pipeline-Risers Based on Signals of Incomplete Cycles, Journal of Engineering Thermophysics, 2015, vol. 36, No. 9, pp. 1966-1970.
(Continued)

*Primary Examiner* — William M McCalister

(57) ABSTRACT

A pre-alarming method, a control method, and a control system for a harmful flow pattern in an oil and gas pipeline-riser system are provided. Support vector machines are trained. Through at least three pressure difference signals on the pipeline-riser system, an overall flow pattern in the pipeline-riser system is continuously and rapidly identified. Depending on monitoring on formation of a long liquid slug in a seabed pipeline and a quick response of the mean value of each pressure difference signal on a flow rate change, (Continued)

pre-alarming for a liquid slug caused by different mechanisms is realized, and liquid slug formation positions respectively of seabed pipeline and riser bottom are correspondingly pre-alarmed; after a pre-alarm is issued, there is enough time for a control device to respond, so as to avoid formation of the harmful flow pattern or damages caused by the harmful flow pattern.

7 Claims, 5 Drawing Sheets

(51) Int. Cl.
E21B 44/00 (2006.01)
E21B 43/12 (2006.01)
E21B 47/06 (2012.01)
G08B 21/12 (2006.01)

(58) Field of Classification Search
USPC .......................................................... 137/14
See application file for complete search history.

(56) References Cited

U.S. PATENT DOCUMENTS

| | | | | |
|---|---|---|---|---|
| 2006/0041392 A1* | 2/2006 | Korske | ................ | G05D 7/0635 702/50 |
| 2008/0082215 A1* | 4/2008 | McDowell | ........... | G05D 7/0688 700/282 |
| 2009/0149969 A1* | 6/2009 | Slupphaug | ........... | G05D 7/0635 700/282 |
| 2009/0223672 A1* | 9/2009 | Naik | ....................... | F16L 55/46 166/344 |
| 2011/0048544 A1* | 3/2011 | Calvert | ................ | G05D 7/0635 137/154 |
| 2012/0034103 A1* | 2/2012 | Bartenev | ............... | E21B 43/128 417/1 |
| 2016/0312959 A1* | 10/2016 | Brenskelle | ................ | F17D 3/05 |
| 2019/0294183 A1* | 9/2019 | Al Khunaizi | ............. | F17D 5/00 |
| 2021/0116076 A1* | 4/2021 | Ward | ..................... | G06N 3/045 |

FOREIGN PATENT DOCUMENTS

| | | |
|---|---|---|
| CN | 1297779 C | 1/2007 |
| CN | 101255952 A | 9/2008 |
| CN | 102305352 A | 1/2012 |
| CN | 102410391 A | 4/2012 |
| CN | 104061443 A | 9/2014 |
| CN | 104791604 A | 7/2015 |
| CN | 105806591 A | 7/2016 |
| CN | 105823617 A | 8/2016 |
| CN | 205453931 U | 8/2016 |
| CN | 109458561 A | 3/2019 |
| CN | 208888990 U | 5/2019 |
| KR | 20120034928 A | 4/2012 |

OTHER PUBLICATIONS

Zou et at., Effect of Measurement Position on Signal Length for Recognition of Global Flow Regime in Pipeline-riser, 10th International Symposium on Measurement Techniques for Multiphase Flow, 2017, pp. 116-1 to 116-8.

Zou et al., Fast recognition of global flow regime in pipeline-riser system by spatial correlation of differential pressures, International Journal of Multiphase Flow, 2017, vol. 88, pp. 222-237.

Zou et al., Non-uniformity of gasliquid flow in a riser and impact of operation and pipe configuration on slugging characteristics, Experimental Thermal and Fluid Science, 2018, vol. 96, pp. 329-346.

* cited by examiner

PRE-ALARMING METHOD, CONTROL METHOD AND CONTROL SYSTEM FOR HARMFUL FLOW PATTERN IN OIL AND GAS PIPELINE-RISER SYSTEM

BACKGROUND OF THE PRESENT INVENTION

Field of Invention

The present invention relates to a field of flow assurance of offshore oil and gas field, and more particularly to a pre-alarming method, a control method and a control system for a harmful flow pattern in an oil and gas pipeline-riser system.

Description of Related Arts

In the offshore oil and gas development, the products such as oil and gas collected from the seabed are lifted to the production platform at the sea surface through the pipeline. Because the products of several oil wells are normally gathered in one platform, a distance from each oil well to the platform is relatively long. The pipeline from the wellhead is firstly laid along the seabed, then leaves the seabed after reaching the bottom of the platform, and reaches the sea surface; wherein: a pipeline section from a position where the pipeline leaves the seabed to the platform at the sea surface is called as the riser. When the gas-liquid flow rate is relatively low, a long liquid slug is easily formed in the riser and flows out alternately with the gaseous phase, causing the severe fluctuation of the flow rate at the outlet, namely the unstable flow pattern; and the above flow pattern is called as the severe slugging. Moreover, if the pipeline has a large diameter, because of the instability of the gas-liquid phase interface in the certain gas-liquid flow rate range, a relatively long hydrodynamic liquid slug is easily formed in the seabed pipeline, also causing the severe fluctuation of the flow rate at the pipeline outlet. The unstable flow pattern represented by the severe slugging brings various damages to the offshore oil and gas production, such as the severe yield fluctuation, the severe pressure fluctuation and pipeline vibration, the cut-off flow or overflow of the gas-liquid separator, the aggravated pipeline corrosion and the wax precipitation, which not only affects the production efficiency, but also seriously damages the safety of pipeline, platform and downstream equipment. In engineering, the harmful flow pattern needs to be identified in time and pre-alarmed in advance, so as to avoid the formation or damages caused by the harmful flow pattern.

In order to rapidly identify the flow pattern, in prior art, through the coupling relationship of gas-liquid phase distribution (can be represented by the pressure difference of vertical section, wherein the friction pressure drop relative to the gravity pressure drop can be ignored) at three different positions on the riser and between the top of the riser and the gas-liquid separator, the rapid identification of the harmful flow pattern is realized. Generally, the stop valve and/or the regulating valve are arranged between the top of the riser and the gas-liquid separator. When the opening degree of the valve changes, the throttling coefficient also changes, causing the pressure difference change of the corresponding pipeline section, so that the signal sample feature distributions of different flow patterns also change. The regulation of the valves is a common process during oil and gas production. Therefore, the identification result of the above scheme is sensitive to the opening degree of the valves.

In prior art, through the gas-liquid flow rates at the outlets of the gas-liquid separator and the slug catcher, and the pressure and the liquid level signal in the gas-liquid separator, the control of the total volume flow rate and liquid flow rate is realized, so as to guarantee the safety of the gas-liquid separator and the slug catcher. However, the above method does not involve the regulation of the flow pattern in the pipeline, so that it is unable to avoid the formation of the severe slugging.

In prior art, through the own pressure and liquid level of the gas-liquid separator and the riser pressure difference signal, the cascade PID (Proportion Integration Differentiation) control loop is formed. Because the regulation of the separator pressure needs a relatively long time, although the above method has the certain effect on the assurance of the gas-liquid separator, it is unable to avoid the formation of the severe slugging and rapidly eliminate the severe slugging after formation.

In prior art, through the pressure signal at the bottom of the riser, the PID control is realized. However, the increase of the liquid phase makes the severe slugging less likely to happen, only illustrating that the control model is applicable to different flow rates. It should be noted that: if the program is started after the severe slugging happens, it needs several periods to eliminate the severe slugging.

In prior art, through the pressure signal at the pipeline inlet, the PID control is realized, so as to inhibit the pressure fluctuation. The above method is only applicable to the flow control between two platforms (the pipeline is U-shaped overall), not applicable to the flow control from the wellhead to the platform (at a condition of relatively long pipeline).

The above methods in prior art are adopted only for preventing the pipeline from overpressure, not for monitoring the formation of the severe slugging, which are mainly to avoid arranging the sensors at the seabed. It is showed by the thesis research (Zou et al., Experimental Thermal and Fluid Science, Vol. 96, pp. 329-346) that: when the severe slugging happens, the pressure fluctuation propagates from the downstream to the upstream. Thus, the upstream signal is not effectively utilized, and the formation of the severe slugging cannot be well monitored.

In conclusion, it can be found that: although the above control methods based on the signal fluctuation amplitude can eliminate the severe slugging after formation, but cannot avoid the formation thereof.

SUMMARY OF THE PRESENT INVENTION

Objects of the present invention are to provide a pre-alarming method, a control method and a control system for a harmful flow pattern in an oil and gas pipeline-riser system, so as to overcome deficiencies in prior art.

In order to accomplish the above objects, the present invention adopts technical solutions as follows.

A pre-alarming method for a harmful flow pattern in an oil and gas pipeline-riser system comprises steps of:

(1), through at least three pressure difference signals on the pipeline-riser system, continuously and rapidly identifying an overall flow pattern in the pipeline-riser system, and acquiring a non-dimensional mean value of each pressure difference signal; wherein: the pressure difference signals comprise at least one seabed pipeline pressure difference $DP1$ and at least two riser pressure differences; the riser pressure differences comprise a total riser pressure difference $DP2$ and a local riser pressure difference $DP3$;

(2), with a seabed pipeline liquid slug formation mechanism and a first liquid slug formation position parameter, training a first support vector machine; and, with a riser bottom liquid slug formation mechanism and a second liquid slug formation position parameter, training a second support vector machine; and (3), if a non-dimensional mean value of the total riser pressure difference DP2 is smaller than 0.4, inputting at least three pressure difference signals into the first support vector machine and judging; if at least one sample is judged as an unstable flow pattern by the first support vector machine, issuing a pre-alarm and judging that a liquid slug is formed in a seabed pipeline; otherwise, not issuing the pre-alarm; if the non-dimensional mean value of the total riser pressure difference DP2 is larger than 0.4, inputting at least three pressure difference signals into the second support vector machine and judging; if one sample is judged as an unstable flow pattern by the second support vector machine, identifying three consecutive samples thereafter; if the three consecutive samples are all identified as unstable flow patterns, issuing the pre-alarm, and judging that a liquid slug is formed at a bottom of a riser; otherwise, not issuing the pre-alarm.

Preferably, signal parameters inputted into the first support vector machine or the second support vector machine comprise a non-dimensional mean value and a standard deviation of the seabed pipeline pressure difference DP1, the non-dimensional mean value and a range of the total riser pressure difference DP2, and a non-dimensional mean value and a standard deviation of the local riser pressure difference DP3.

Preferably, the seabed pipeline pressure difference DP1 and the total riser pressure difference DP2 are non-dimensionalized through dividing signal values of the seabed pipeline pressure difference DP1 and the total riser pressure difference DP2 respectively by pressure differences of corresponding pressure difference test sections when being full of stationary liquid phase.

Preferably, the local riser pressure difference DP3 is non-dimensionalized through dividing a signal value of the local riser pressure difference DP3 by a friction pressure difference of a liquid phase when flowing through a corresponding pressure difference test section at unit speed under assumption of hydraulically smooth pipe.

Preferably, training samples for the support vector machines are selected from a steady-state flow process, which is a process with constant inlet flow rate and outlet pressure; and a specific form of each support vector machine is expressed as:

$$f(x) = \mathrm{sgn}\left(\sum_{i=1}^{n} y_i \alpha_i K(x_i, x) + b\right),$$

wherein:

x is a feature vector of a sample to be tested; $x_i$ and $y_i$ are respectively a feature vector of a known sample and a flow pattern type (represented as 1 or −1); $\alpha_i$ and b are parameters of each support vector machine, which are determined through training; K is a kernel function; and, f(x) is 1 or −1, which is an identification result.

Preferably, training for the support vector machines is completed through a support vector machine toolkit based on Matlab; through inputting the feature vector of the sample to be tested into a corresponding support vector machine, a result of flow pattern identification is obtained.

A control method for a harmful flow pattern in an oil and gas pipeline-riser system comprises steps of:

if a liquid slug is judged to be formed in a seabed pipeline, turning down a throttle valve at a top of a riser and gaseous phase valves of a gas-liquid separator and a slug catcher, and turning up liquid phase valves of the gas-liquid separator and the slug catcher; if a liquid slug is judged to be formed at a bottom of the riser, opening a gas injection valve at the bottom of the riser, then turning down the throttle valve at the top of the riser, and closing the gas injection valve after a flow in the pipeline-riser system reaches a steady state.

A control system for a harmful flow pattern in an offshore oil and gas pipeline-riser system is provided, comprising a monitoring device and a control device, wherein: the monitoring device comprises a computer control module and differential pressure measurement devices for monitoring pressure differences at different sections of the pipeline-riser system; a processing module and a data collection module are arranged inside the computer control module; the data collection module is connected to the differential pressure measurement devices, for collecting the pressure differences at the different sections of the pipeline-riser system; the processing module is for writing programs of a pre-alarming method and a control method, for processing data collected by the data collection module, and for outputting signals; and the control device comprises a gas injection device interconnected with a bottom of a riser and a throttle valve connected with an upper end of the riser; an end of the throttle valve on the riser is connected with a slug catcher; a gaseous phase outlet of the slug catcher is equipped with a first gaseous phase valve; a liquid phase outlet of the slug catcher is equipped with a first liquid phase valve; outlets of the first gaseous phase valve and the first liquid phase valve are connected with a gas-liquid separator; a gaseous phase outlet of the gas-liquid separator is connected with a second gaseous phase valve; a liquid phase outlet of the gas-liquid separator is connected with a second liquid phase valve; and the processing module is connected to each valve.

Preferably, the pipeline-riser system comprises a seabed pipeline and the riser; a first differential pressure measurement device is arranged on the seabed pipeline; and, at least two differential pressure measurement devices are arranged on the riser.

Compared with the prior art, the present invention has beneficial technical effects as follows.

According to the pre-alarming method for the harmful flow pattern in the oil and gas pipeline-riser system provided by the present invention, with adopting the conventional seabed pipeline liquid slug formation mechanism and riser bottom liquid slug formation mechanism, and adopting the liquid slug formation position parameters, the support vector machines are trained; through at least three pressure difference signals on the pipeline-riser system, the overall flow pattern in the pipeline-riser system is continuously and rapidly identified, and the non-dimensional mean value of each pressure difference signal is acquired; depending on monitoring on the formation of the long liquid slug in the seabed pipeline and the quick response of the mean value of each pressure difference signal on the flow rate change, pre-alarming for the liquid slug caused by the instability of the gas-liquid phase interface and the structure of the pipeline-riser system is realized, and the liquid slug formation positions respectively of seabed pipeline and riser bottom are correspondingly pre-alarmed, thereby realizing the accurate judgment of liquid slug position; after the pre-alarm is issued, there is enough time for the control device to respond, so as to avoid the formation of the harmful flow pattern or the damages caused by the harmful flow pattern. The present invention has a high pre-alarming reliability and a low false alarm rate, which is able to obviously improve the margin of flow assurance.

According to the control method for the harmful flow pattern in the oil and gas pipeline-riser system provided by the present invention, through the accurate judgment of liquid slug position and pre-alarming, there is enough time for the control device to respond, which avoids the decrease of identification accuracy caused by the change of the opening degree of the valves, so that a pre-alarming reliability is ensured; through the effective utilization of the upstream signals, the advanced control is realized, which greatly avoids the formation of the severe slugging.

According to the control system for the harmful flow pattern in the offshore oil and gas pipeline-riser system provided by the present invention, the gas injection device interconnected with the bottom of the riser and the throttle valve connected with the upper end of the riser are arranged; valves are arranged at the inlets and outlets of the slug catcher and the gas-liquid separator; because the pre-alarming advance amount is relatively small, it is required to appropriately turn down the throttle valve at the top of the riser and the gaseous phase valves of the gas-liquid separator and the slug catcher, and appropriately turn up the liquid phase valves of the gas-liquid separator and the slug catcher; because the space of the slug catcher is released in advance, the volumes of the gas-liquid separator and the slug catcher at the top of the riser are both decreased, so as to release the platform space and decrease the platform load.

BRIEF DESCRIPTION OF THE DRAWINGS

FIG. 3(*a*) and FIG. 3(*b*) show signal oscillograms of a transition process of a harmful flow pattern, wherein: in FIG. 3(*a*), a liquid slug is formed in a seabed pipeline; and in FIG. 3(*b*), a liquid slug is formed at a bottom of a riser.

DETAILED DESCRIPTION OF THE PREFERRED EMBODIMENT

The present invention is further described in detail with accompanying drawings as follows.

Figure 1:
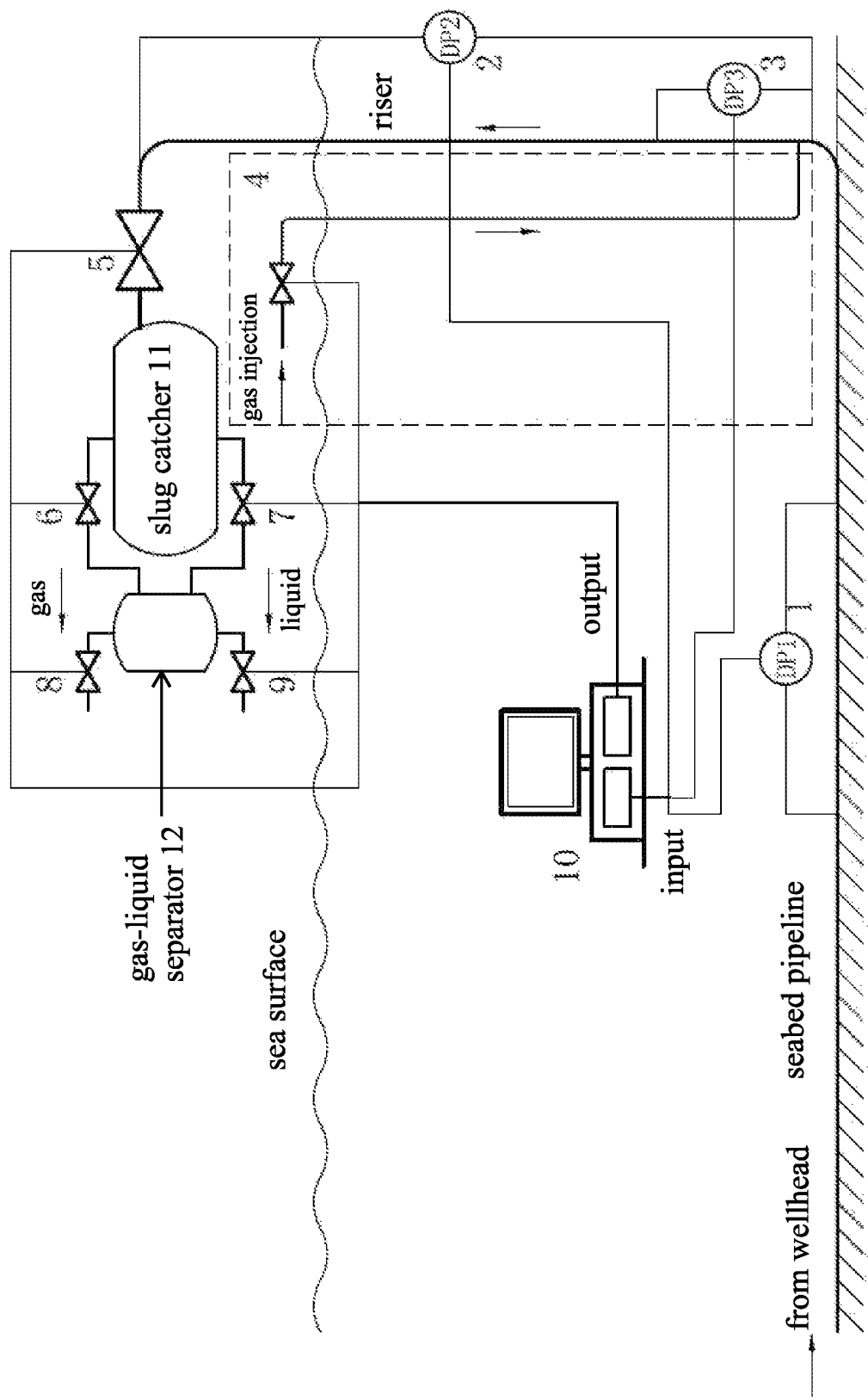
FIG. 1 is a structural sketch view of a control system according to the present invention.
Figure 2:
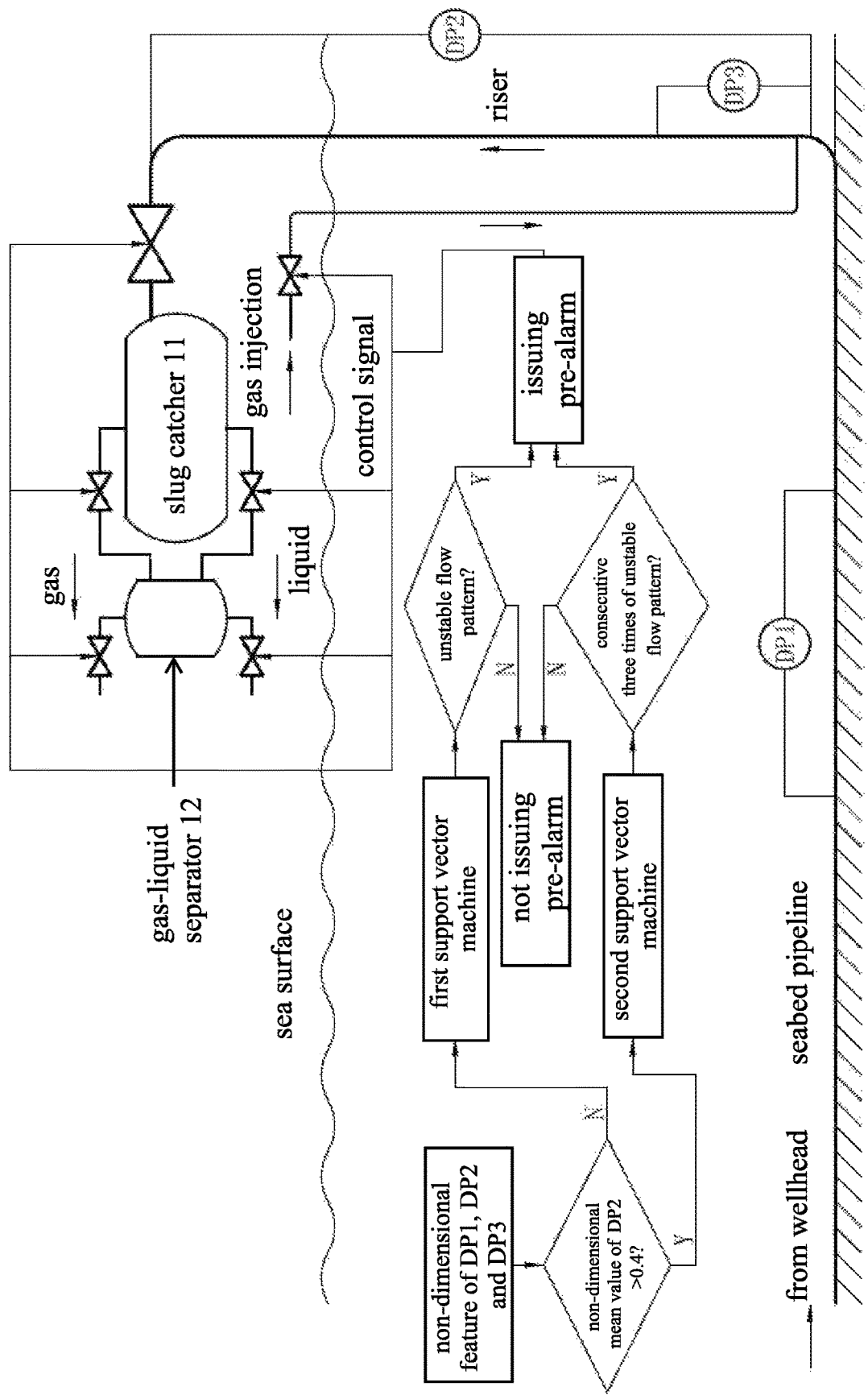
FIG. 2 is a flow diagram of a pre-alarming method according to the present invention.

As shown in FIG. 1 and FIG. 2, a control system for a harmful flow pattern in an offshore oil and gas pipeline-riser system is provided, comprising a monitoring device and a control device, wherein: the monitoring device comprises a computer control module 10 and differential pressure measurement devices 1-3 for monitoring pressure differences at different sections of the pipeline-riser system; a processing module and a data collection module are arranged inside the computer control module; the data collection module is connected to the differential pressure measurement devices 1-3, for collecting the pressure differences at the different sections of the pipeline-riser system; the processing module is for writing programs of a pre-alarming method and a control method, for processing data collected by the data collection module, and for outputting signals; and the control device comprises a gas injection device 4 interconnected with a bottom of a riser and a throttle valve 5 connected with an upper end of the riser; an end of the throttle valve on the riser is connected with a slug catcher 11; a gaseous phase outlet of the slug catcher is equipped with a first gaseous phase valve 6; a liquid phase outlet of the slug catcher is equipped with a first liquid phase valve 7; outlets of the first gaseous phase valve 6 and the first liquid phase valve 7 are connected with a gas-liquid separator 12; a gaseous phase outlet of the gas-liquid separator is connected with a second gaseous phase valve 8; a liquid phase outlet of the gas-liquid separator is connected with a second liquid phase valve 9; and the processing module is connected to each valve.

The pipeline-riser system comprises a seabed pipeline and the riser; a first differential pressure measurement device 1 is arranged on the seabed pipeline; and, at least two differential pressure measurement devices 2 and 3 are arranged on the riser.

The present invention further provides a pre-alarming method for the harmful flow pattern in the offshore oil and gas pipeline-riser system, comprising steps of: through at least three pressure difference signals on the pipeline-riser system, continuously and rapidly identifying an overall flow pattern in the pipeline-riser system, wherein the three pressure difference signals are respectively a seabed pipeline pressure difference DP1, a total riser pressure difference DP2 and a local riser pressure difference DP3. In the preferred embodiment, a sample length is 10 seconds; an adopted identification method is using support vector machines or a neural network identification method; and training samples are selected from a steady-state process.

Formation reasons of liquid slug comprise a structure of the pipeline-riser system and instability of a gas-liquid phase interface (namely hydrodynamics), so that corresponding lengths and formation positions of the liquid slugs are different, which are both closely related to a mean value of the total riser pressure difference DP2. Thus, two support vector machines are firstly trained according to different ranges of a non-dimensional mean value of the total riser pressure difference DP2; and then, flow pattern identification is completed through the two support vector machines; wherein: input parameters of the two support vector machines comprise a non-dimensional mean value and a standard deviation of the seabed pipeline pressure difference DP1, the non-dimensional mean value and a range of the total riser pressure difference DP2, and a non-dimensional mean value and a standard deviation of the local riser pressure difference DP3.

In the preferred embodiment, the seabed pipeline pressure difference DP1 and the total riser pressure difference DP2 are non-dimensionalized through dividing signal values of the seabed pipeline pressure difference DP1 and the total riser pressure difference DP2 respectively by pressure differences of corresponding pressure difference test sections when being full of stationary liquid phase; and the local riser pressure difference DP3 is non-dimensionalized through dividing a signal value of the local riser pressure difference DP3 by a friction pressure difference of a liquid phase when flowing through a corresponding pressure difference test section at unit speed under assumption of hydraulically smooth pipe.

The training samples for the support vector machines are selected from a steady-state flow process, namely a process with constant inlet flow rate and outlet pressure. A specific form of each support vector machine is expressed as:

$$f(x) = \text{sgn}\left(\sum_{i=1}^{n} y_i \alpha_i K(x_i, x) + b\right),$$

wherein:

x is a feature vector of a sample to be tested; $x_i$ and $y_i$ are respectively a feature vector of a known sample and a flow pattern type (represented as 1 or −1); $\alpha_i$ and b are parameters of each support vector machine, which are determined through training; K is a kernel function, wherein a radial basis function is selected in the preferred embodiment; and, f(x) is 1 or −1, which is namely an identification result.

Training for the support vector machines is completed through a support vector machine toolkit based on Matlab (download link: https://www.esat.kuleuven.be/sista/lssvmlab/); through inputting the feature vector of the sample to be tested into a corresponding support vector machine, a result of flow pattern identification is obtained.

A first support vector machine is trained with a seabed pipeline liquid slug formation mechanism and a first liquid slug formation position parameter; a second support vector machine is trained with a riser bottom liquid slug formation mechanism and a second liquid slug formation position parameter; because the two support vector machines respectively correspond to different liquid slug formation mechanisms and different liquid slug formation positions, parameters of each support vector machine obtained after training are different. According to the present invention, under conditions of different opening degrees of the throttle valve at a top of the riser, some samples of the steady-state flow process are collected for testing the two support vector machines after training; an identification accuracy of the above samples is larger than 90%, indicating that a flow pattern identification model used for pre-alarming is reliable enough.

Thereafter, collected signal parameters are inputted into the two support vector machines after training, and corresponding results are obtained. Particularly, if the non-dimensional mean value of the total riser pressure difference DP2 in the signal samples is smaller than 0.4, the first support vector machine is used for identification; if the non-dimensional mean value of the total riser pressure difference DP2 is larger than 0.4, the second support vector machine is used for identification; when one sample is identified by the first support vector machine as an unstable flow pattern, a pre-alarm is issued, and a liquid slug is judged to be formed in the seabed pipeline; when one sample is identified by the second support vector machine as the unstable flow pattern, three consecutive samples thereafter are identified; if the three consecutive samples are all identified as the unstable flow patterns, the pre-alarm is issued, and a liquid slug is judged to be formed at the bottom of the riser; otherwise, the pre-alarm is not issued. In the preferred embodiment, "1" outputted by each support vector machine represents a stable flow pattern, and "−1" represents an unstable flow pattern.

Figures 3A, 3B:
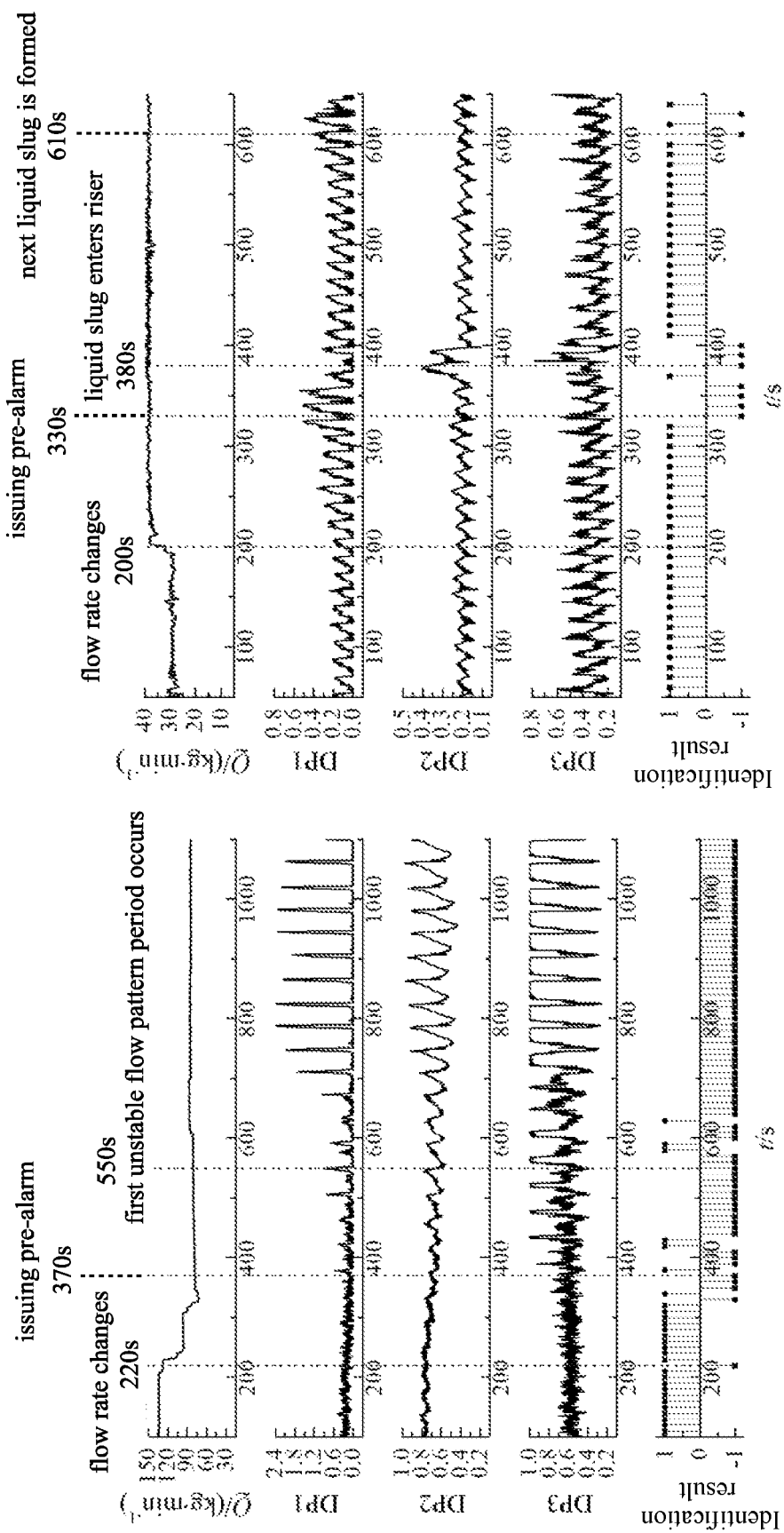

With applying the above pre-alarming method in the pipeline-riser system, the harmful flow pattern is pre-alarmed. Combined with FIG. 2, a principle of pre-alarming is further illustrated. As shown in FIG. 3(a), after a flow rate at an inlet of the pipeline-riser system changes at the $220^{th}$ second, the mean values of the three pressure difference signals rapidly change; from the $350^{th}$ second, the identification results show three consecutive "−1"; when the pre-alarm is issued at the $370^{th}$ second, a fluctuation amplitude of the total riser pressure difference DP2 is not obviously increased; at the $550^{th}$ second, the fluctuation amplitude of the total riser pressure difference DP2 reaches a defined standard of the unstable flow pattern; that is to say, an advance amount of pre-alarming is 180 seconds. As shown in FIG. 3(b), the flow rate at the inlet of the pipeline-riser system changes at the $200^{th}$ second; at the $320^{th}$ second, a long liquid slug is formed in the seabed pipeline; at the $330^{th}$ second, the identification result shows "−1" and the pre-alarm is issued; at the $380^{th}$ second, the liquid slug enters the riser; that is to say, an advance amount of pre-alarming is 50 seconds; and, at the $610^{th}$ second, a next liquid slug is monitored to be formed (the identification result shows "−1"), and the pre-alarm is issued; once the pre-alarm is issued, a control response is started.

Combined with the liquid slug formation causes in the pipeline-riser system, it can be known that: for a situation shown in FIG. 3(a), a gaseous phase flow rate is relatively low, a severe slugging is caused by the structure of the pipeline-riser system, and the liquid slug is formed at the bottom of the riser; a pre-alarming advance amount for the above severe slugging is 100-1360 seconds, and eighteen transitions all trigger the pre-alarm; for a situation shown in FIG. 3(b), a gaseous phase flow rate is relatively high, the gas-liquid phase interface is unstable, and a relatively long hydrodynamic liquid slug is formed in the seabed pipeline; a pre-alarming advance amount for the above liquid slug is 20-960 seconds, and fifteen of sixteen transitions trigger the pre-alarm; in the preferred embodiment, a pre-alarm trigger rate is 97%, indicating that the present invention has a high reliability. Meanwhile, a situation that there are both stable flow patterns before and after the flow rate change is also checked, totally fourteen working conditions, wherein: the hydrodynamic long liquid slug occurs during the transition process in one working condition, and the pre-alarm is issued 60 seconds in advance with the present invention; for other thirteen working conditions without the long liquid slug, the identification result shows "−1" in the transient process of four working conditions, but only one is the false alarm; therefore, in the preferred embodiment, the false alarm rate is 7%, which greatly avoids the malfunction of the control device.

If the liquid slug is pre-alarmed to be formed in the seabed pipeline, because the pre-alarming advance amount is relatively small (the pre-alarming advance amount is still enough for the valves, but the liquid slug may be not eliminated), it is required to appropriately turn down the throttle valve at the top of the riser and the gaseous phase valves of the gas-liquid separator and the slug catcher, and appropriately turn up the liquid phase valves of the gas-liquid separator and the slug catcher. Objects of the above operations to the valves are to delay the liquid slug eruption, keep the pressures of the gas-liquid separator and the slug catcher stable, and release the space of the slug catcher to receive the liquid slug. The regulating amount of the valves is determined by the length of the liquid slug, wherein the length of the hydrodynamic liquid slug can be calculated through a Brill formula (SPE Journal, Vol. 271, pp. 363-378). Because the space of the slug catcher is released in advance, compared with the conventional separator control method, the volume of the slug catcher and/or the gas-liquid separator can be decreased with applying the present invention.

If the liquid slug is pre-alarmed to be formed at the bottom of the riser, because the pre-alarming advance amount is relatively large, the gas injection valve at the bottom of the riser is opened, and the throttle valve at the top of the riser is turned down; after the flow in the pipeline-riser system reaches a new steady state, the gas injection valve is closed. If there is no gas injection condition at the bottom of the riser, the throttle valve is directly turned down. The reason why gas injection is firstly implemented is that: gas injection can avoid the formation of the severe slugging during the transient process of flow rate change, while throttling cannot guarantee to avoid it; if the pre-alarm is triggered late, after turning down the throttle valve, the total riser pressure difference will still have one or several periods of large fluctuation (but the fluctuation amplitude will be smaller than that without throttling), and then the fluctuation amplitude is gradually decreased. Through firstly turning down the throttle valve and then closing the gas injection valve, it is guaranteed that the severe slugging will not occur again during the control process.

Figure 4:
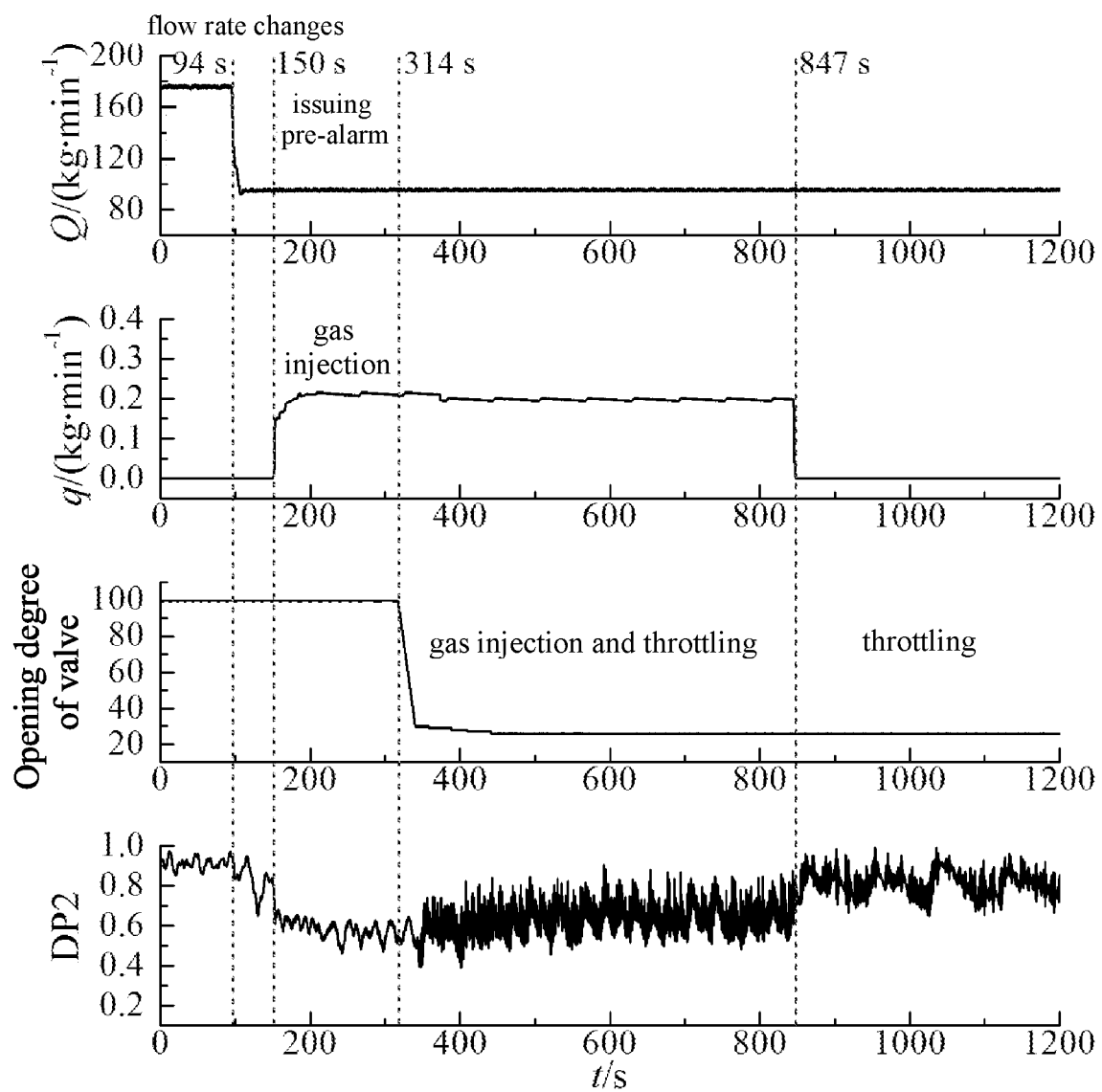
FIG. 4 is a control response effect diagram with applying a control response method according to the present invention.
Figure 5:
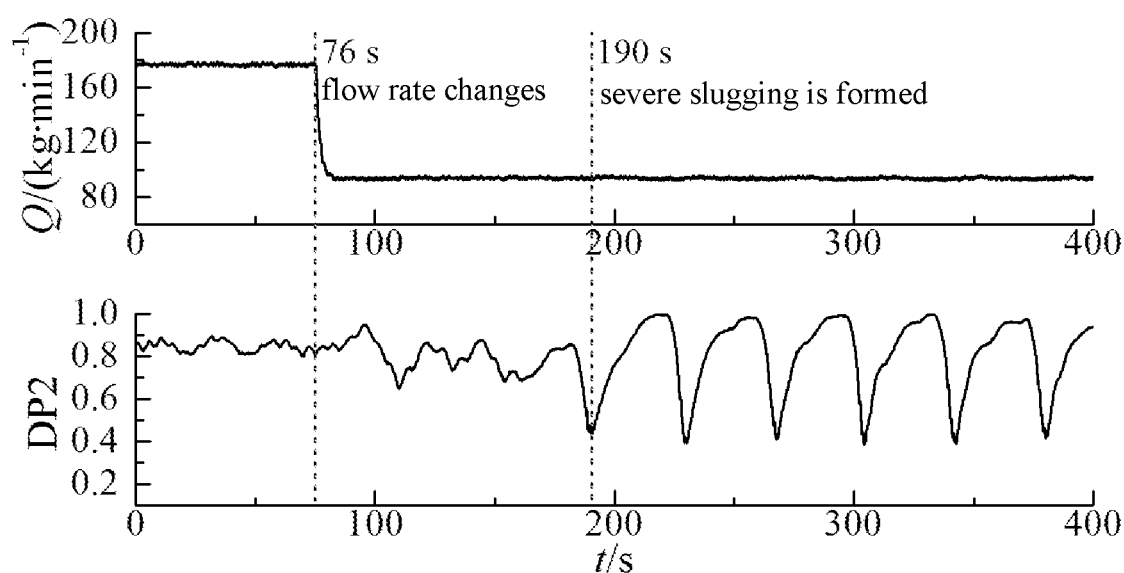
FIG. 5 is a transition effect diagram of a flow pattern without applying any control method.

Combined with the control response effect shown in FIG. 4, the control response method of the present invention is further illustrated as follows. As shown in FIG. 4, after the flow rate at the inlet of the pipeline-riser system changes at the $94^{th}$ second, the pre-alarm is issued at the $150^{th}$ second; once the pre-alarm is issued, the gas injection control is implemented. FIG. 5 shows a transition of the flow pattern at the same working condition (the same values before and after the gas-liquid flow rate change at the inlet) without applying any control method. Through comparison, it can be known that: if gas injection is implemented immediately after the pre-alarm is issued, the severe slugging will not form. As shown in FIG. 4, the throttle valve is turned down at the $314^{th}$ second, and a combination control stage of gas injection and throttling is started; in the combination control stage, the total riser pressure difference DP2 shows small high-frequency fluctuation; then, at the $847^{th}$ second, gas injection is ended; although the fluctuation frequency of the total riser pressure difference DP2 is decreased, the amplitude value has no obvious change, and the severe slugging does not occur.

After the flow state reaches the steady state through above control, it can be switched to the automatic control method described in prior art, for steady-state control.

What is claimed is:

1. A pre-alarming method for a harmful flow pattern in an oil and gas pipeline-riser system, comprising steps of:
   (1), through at least three pressure difference signals on the pipeline-riser system, identifying an overall flow pattern in the pipeline-riser system, and acquiring a non-dimensional mean value of each pressure difference signal; wherein: the pressure difference signals comprise at least one seabed pipeline pressure difference DP1 and at least two riser pressure differences; the riser pressure differences comprise a total riser pressure difference DP2 and a local riser pressure difference DP3;
   (2), with a seabed pipeline liquid slug formation mechanism and a first liquid slug formation position parameter, training a first support vector machine; and, with a riser bottom liquid slug formation mechanism and a second liquid slug formation position parameter, training a second support vector machine; and
   (3), if a non-dimensional mean value of the total riser pressure difference DP2 is smaller than 0.4, inputting at least three pressure difference signals into the first support vector machine and judging; if at least one sample is judged as an unstable flow pattern by the first support vector machine, issuing a pre-alarm and judging that a liquid slug is formed in a seabed pipeline; otherwise, not issuing the pre-alarm; if the non-dimensional mean value of the total riser pressure difference DP2 is larger than 0.4, inputting at least three pressure difference signals into the second support vector machine and judging; if one sample is judged as an unstable flow pattern by the second support vector machine, identifying three consecutive samples thereafter; if the three consecutive samples are all identified as unstable flow patterns, issuing the pre-alarm, and judging that a liquid slug is formed at a bottom of a riser; otherwise, not issuing the pre-alarm.

2. The pre-alarming method for the harmful flow pattern in the oil and gas pipeline-riser system, as recited in claim 1, wherein signal parameters inputted into the first support vector machine or the second support vector machine comprise a non-dimensional mean value and a standard deviation of the seabed pipeline pressure difference DP1, the non-dimensional mean value and a range of the total riser pressure difference DP2, and a non-dimensional mean value and a standard deviation of the local riser pressure difference DP3.

3. The pre-alarming method for the harmful flow pattern in the oil and gas pipeline-riser system, as recited in claim 1, wherein: the seabed pipeline pressure difference DP1 and the total riser pressure difference DP2 are non-dimensionalized through dividing signal values of the seabed pipeline pressure difference DP1 and the total riser pressure difference DP2 respectively by pressure differences of corresponding pressure difference test sections when being full of stationary liquid phase.

4. The pre-alarming method for the harmful flow pattern in the oil and gas pipeline-riser system, as recited in claim 1, wherein: the local riser pressure difference DP3 is non-dimensionalized through dividing a signal value of the local riser pressure difference DP3 by a friction pressure difference of a liquid phase when flowing through a corresponding pressure difference test section at unit speed under assumption of hydraulically smooth pipe.

5. The pre-alarming method for the harmful flow pattern in the oil and gas pipeline-riser system, as recited in claim 1, wherein:
   training samples for the support vector machines are selected from a steady-state flow process, which is a process with constant inlet flow rate and outlet pressure; and a specific form of each support vector machine is expressed as:

$$f(x) = \mathrm{sgn}\left(\sum_{i=1}^{n} y_i \alpha_i K(x_i, x) + b\right),$$

wherein:
   $x$ is a feature vector of a sample to be tested; $x_i$ and $y_i$ are respectively a feature vector of a known sample and a flow pattern type (represented as 1 or −1); $\alpha_i$ and $b$ are parameters of each support vector machine, which are determined through training; K is a kernel function; and, $f(x)$ is 1 or −1, which is an identification result.

6. The pre-alarming method for the harmful flow pattern in the oil and gas pipeline-riser system, as recited in claim 1, wherein: training for the support vector machines is completed through a support vector machine toolkit based on Matlab; through inputting a feature vector of a sample to be tested into a corresponding support vector machine, a result of flow pattern identification is obtained.

7. The pre-alarming method for the harmful flow pattern in the oil and gas pipeline-riser system, as recited in claim 1, further comprising:

if a liquid slug is judged to be formed in a seabed pipeline, turning down a throttle valve at a top of a riser and gaseous phase valves of a gas-liquid separator and a slug catcher, and turning up liquid phase valves of the gas-liquid separator and the slug catcher; if a liquid slug is judged to be formed at a bottom of the riser, opening a gas injection valve at the bottom of the riser, then turning down the throttle valve at the top of the riser, and closing the gas injection valve after a flow in the pipeline-riser system reaches a steady state.

\* \* \* \* \*